United States Patent
Mukherjee et al.

(10) Patent No.: US 10,775,229 B2
(45) Date of Patent: Sep. 15, 2020

(54) SYSTEMS AND METHODS FOR AUTONOMOUS STROBOSCOPIC MACHINE INSPECTION FOR MULTI-POINT AND MULTI-FREQUENCY VIBRATION MEASUREMENT

(71) Applicant: Tata Consultancy Services Limited, Mumbai (IN)

(72) Inventors: Sushovan Mukherjee, Kolkata (IN); Dibyendu Roy, Kolkata (IN); Tapas Chakravarty, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 449 days.

(21) Appl. No.: 15/922,521

(22) Filed: Mar. 15, 2018

(65) Prior Publication Data

US 2019/0033124 A1    Jan. 31, 2019

(30) Foreign Application Priority Data

Jul. 29, 2017    (IN) .............................. 201721027017

(51) Int. Cl.
| | |
|---|---|
| *G01H 9/00* | (2006.01) |
| *G09G 3/34* | (2006.01) |
| *G01M 7/00* | (2006.01) |
| *G01N 21/88* | (2006.01) |
| *G01H 1/00* | (2006.01) |
| *G01M 1/22* | (2006.01) |
| *G01M 1/20* | (2006.01) |

(52) U.S. Cl.
CPC .............. *G01H 9/002* (2013.01); *G01H 1/003* (2013.01); *G01H 9/00* (2013.01); *G01M 1/20* (2013.01);
(Continued)

(58) Field of Classification Search
CPC .......... G01H 9/002; G01H 1/003; G01H 9/00; G01M 1/20; G01M 1/22; G01M 7/00;
(Continued)

(56) References Cited

U.S. PATENT DOCUMENTS

| | | | | |
|---|---|---|---|---|
| 3,533,296 | A | * 10/1970 | Ostrander ............... | G01M 1/20 73/466 |
| 8,711,462 | B1 | * 4/2014 | Kaiser .................... | G02B 30/24 359/238 |

(Continued)

FOREIGN PATENT DOCUMENTS

CN            104897962        *  9/2015

OTHER PUBLICATIONS

Fluke, "Inspect moving machinery by putting the 'freeze' on", Mar. 20, 2015 Blog on Vibration https://www.fluke.com/en-us/learn/blog/vibration/inspect-moving-machinery-by-putting-the-freeze-on (Year: 2015).*

(Continued)

*Primary Examiner* — Regis J Betsch
(74) *Attorney, Agent, or Firm* — Finnegan, Henderson, Farabow, Garrett & Dunner LLP (57) ABSTRACT

This disclosure relates generally to an optical strobing based multi-frequency vibration measurement, and more particularly to systems and methods for autonomous stroboscopic machine inspection for multi-point and multi-frequency vibration measurement. Embodiments of the present disclosure provide for an optical strobing based multi-frequency vibration measurement by selecting a strobe frequency, obtaining one or more image frames, obtaining a marker position, calculating a fast fourier transformation, obtaining one or more peak prominent frequencies, obtaining a product set of the one or more peak prominent frequencies, optimizing the strobing frequency where the value of the product set of the one or more peak prominent frequencies is not equal to an optimum pre-defined system value and detecting and measuring a plurality of vibrations of multiple frequencies by applying a chinese remainder theorem on the product set and the strobe frequency set.

6 Claims, 9 Drawing Sheets

(52) U.S. Cl.
CPC ............... *G01M 1/22* (2013.01); *G01M 7/00* (2013.01); *G01N 21/8806* (2013.01); *G09G 3/3406* (2013.01); *G01N 2021/8838* (2013.01)

(58) Field of Classification Search
CPC ....... G01N 21/8806; G01N 2021/8838; G09G 3/3406
See application file for complete search history.

(56) References Cited

U.S. PATENT DOCUMENTS

| | | | |
|---|---|---|---|
| 2005/0279172 A1* | 12/2005 | Schreier | G01B 11/167 73/657 |
| 2016/0041068 A1 | 2/2016 | Wascat et al. | |

OTHER PUBLICATIONS

Siebert et al., "High speed image correlation for vibration analysis", 2009 J. Phys.: Conf. Ser. 181 (Year: 2009).*

Ding et al., "Long-range vibration sensor based on correlation analysis of optical frequency-domain", Dec. 17, 2012 / vol. 20, No. 27 / Optics Express (Year: 2012).*

Zhang et al., "A High-Speed Vision-Based Sensor for Dynamic Vibration Analysis Using Fast Motion Extraction Algorithms", Sensors 2016, 16, 572 (Year: 2016).*

Edelman, S. et al., "Stroboscoic Vibration Analyzer", The Journal of the Acoustical Society of America, AIP Publisher LLC, vol. 63C, No. 2, Jul. 15, 1959, 9 pages.

* cited by examiner

SYSTEMS AND METHODS FOR AUTONOMOUS STROBOSCOPIC MACHINE INSPECTION FOR MULTI-POINT AND MULTI-FREQUENCY VIBRATION MEASUREMENT

PRIORITY CLAIM

This U.S. patent application claims priority under 35 U.S.C. § 119 to: India Application No. 201721027017, filed on Jul. 29, 2017. The entire contents of the aforementioned application are incorporated herein by reference.

TECHNICAL FIELD

This disclosure relates generally to an optical strobing based multi-frequency vibration measurement, and more particularly to systems and methods for autonomous stroboscopic machine inspection for multi-point and multi-frequency vibration measurement.

BACKGROUND

Vibration is the oscillation of a component around a central or equilibrium point and it is generally characterized by frequency, amplitude and phase. Vibration constitutes a very important aspect of any dynamic or mechanical system. Frequency measurement of vibrating bodies helps in dynamic characterization of the system. Frequency measurement may also necessary in constituting passive control to identify and mitigate vibration related machine health hazards. If displacement is large enough, as at low frequencies, it can be measured with a scale, calipers, or a measuring microscope. At higher frequencies, displacement measurement requires more sophisticated optical techniques. High-speed movies and video can often be used to measure displacements and are especially valuable for visualizing the motion of complex structures and mechanisms.

Strobe lights and stroboscopic photography are useful when displacements are large enough. Stroboscope also known as a strobe, is an instrument used to make a cyclically moving object appear to be slow-moving, or stationary. It consists of either a rotating disk with slots or holes or a lamp such as a flashtube which produces brief repetitive flashes of light. Usually the rate of the stroboscope is adjustable to different frequencies. When a rotating or vibrating object is observed with the stroboscope at its vibration frequency (or a submultiple of it), it appears stationary. Thus stroboscopes are also used to measure frequency.

However the traditional systems and methods, even those using stroboscopic methodology to detect vibrations only provide for non-contact vibration measurement technique with very high cost of measuring vibrations. Further, there is a large computation time involved when detecting vibrating frequencies. Still further and most importantly, none of the traditional systems and methods have provided for detecting multi-frequency component of vibration. The traditional systems and methods also do not provide for multiple frequency vibration detection at different locations of the machine quickly and optimally.

Hence there is a need for technology which can detect multi frequency component of a vibrating object quickly and efficiently, that can provide for an autonomous stroboscopic machine inspection and detect the vibrations of a machine at different locations.

SUMMARY

Embodiments of the present disclosure present technological improvements as solutions to one or more of the above-mentioned technical problems recognized by the inventors in conventional systems. For example, in one embodiment, a method for an optical strobing based multi-frequency vibration measurement is provided, the method comprising: selecting, based on a camera frequency or a frame rate or one or more prime numbers, an initial strobe frequency; capturing, using the optical strobing, a video and performing conversion of the video into one or more image frames to obtain a marker position for each of the one or more image frames; calculating, using the marker position for the one or more image frames, a fast Fourier transformation (FFT) on time series of the marker position for each of the one or more image frames; deriving, using the FFT, a frequency amplitude spectrum for obtaining one or more peak prominent frequencies or remainders to detect one or more optimum signal frequencies; obtaining, from the one or more peak prominent frequencies or remainders, one or more frequencies having an optimum signal-to-noise-ratio; based on the one or more peak prominent frequencies or remainders performing at least one of: (i) optimizing, using the next available prime number from the one or more of prime numbers, strobing frequency and repeating steps (i) to (v) until one or more of the peak prominent frequencies or remainders are obtained; and (ii) obtaining, using the one or more of frequencies having an optimum signal-to-noise-ratio, a product set of the one or more peak prominent frequencies or remainders; and based on the value of the product set of the one or more peak prominent frequencies or remainders, performing at least one of: (i) optimizing the strobing frequency, using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (ii) obtaining, by applying the Chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies; and detecting and measuring the plurality of vibrations of multiple frequencies by eliminating one or more potential frequency components from the product set of one or more of the peak prominent frequencies or remainders for determining and measuring further corresponding vibrating frequencies.

In another embodiment, there is provided a system for an optical strobing based multi-frequency vibration measurement, the system comprising one or more processors; one or more data storage devices operatively coupled to the one or more processors and configured to store instructions configured for execution by the one or more processors to: select based on a camera frequency or a frame rate or one or more prime numbers, an initial strobe frequency; capture using the optical strobing, a video and performing conversion of the video into one or more image frames to obtain a marker position for each of the one or more image frames; calculate using the marker position for the one or more image frames, a fast Fourier transformation (FFT) on time series of the marker position for each of the one or more image frames; derive using the FFT, a frequency amplitude spectrum for obtaining one or more peak prominent frequencies or remainders to detect one or more optimum signal frequencies; obtain from the one or more peak prominent frequencies or remainders, one or more frequencies having an optimum signal-to-noise-ratio; based on the one or more peak prominent frequencies or remainders perform at least one of: (i) optimize using the next available prime number from the one or more of prime numbers, strobing frequency and repeating steps (i) to (v) until one or more of the peak prominent frequencies or remainders are obtained; and (ii) obtain using the one or more of frequencies having an optimum signal-to-noise-ratio, a product set of the one or more peak prominent frequencies or remainders; based on the value of the product set of the one or more peak prominent frequencies or remainders, perform at least one of: (i) optimize the strobing frequency using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (ii) obtain by applying the chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies; and detecting and measuring the plurality of vibrations of multiple frequencies by eliminating one or more potential frequency components from the product set of one or more of the peak prominent frequencies or remainders for determining and measuring further corresponding vibrating frequencies.

In yet another embodiment, one or more non-transitory machine readable information storage mediums comprising one or more instructions is provided. The one or more instructions when executed by one or more hardware processors causes the one or more hardware processors to perform a method for an optical strobing based multi-frequency vibration measurement, said method comprising: selecting, based on a camera frequency or a frame rate or one or more prime numbers, an initial strobe frequency; capturing, using the optical strobing, a video and performing conversion of the video into one or more image frames to obtain a marker position for each of the one or more image frames; calculating, using the marker position for the one or more image frames, a fast Fourier transformation (FFT) on time series of the marker position for each of the one or more image frames; deriving, using the FFT, a frequency amplitude spectrum for obtaining one or more peak prominent frequencies or remainders to detect one or more optimum signal frequencies; obtaining, from the one or more peak prominent frequencies or remainders, one or more frequencies having an optimum signal-to-noise-ratio; based on the one or more peak prominent frequencies or remainders performing at least one of: (i) optimizing, using the next available prime number from the one or more of prime numbers, strobing frequency and repeating steps (i) to (v) until one or more of the peak prominent frequencies or remainders are obtained; and (ii) obtaining, using the one or more of frequencies having an optimum signal-to-noise-ratio, a product set of the one or more peak prominent frequencies or remainders; and based on the value of the product set of the one or more peak prominent frequencies or remainders, performing at least one of: (i) optimizing the strobing frequency, using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (ii) obtaining, by applying the Chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies; and detecting and measuring the plurality of vibrations of multiple frequencies by eliminating one or more potential frequency components from the product set of one or more of the peak prominent frequencies or remainders for determining and measuring further corresponding vibrating frequencies.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 shows the graphical representation of the peak signals captured when the fast fourier transformation (FFT)

on the marker position of the image frames is calculated at 79 Hz according to an embodiment of the present disclosure;

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 12 where similar reference characters denote corresponding features consistently throughout the figures, there are shown preferred embodiments and these embodiments are described in the context of the following exemplary system and/or method.

The embodiments of the present disclosure provides systems and methods of an autonomous stroboscopic machine inspection for multi-point and multi-frequency vibration measurement. Vibration is the oscillation of a component around a central or equilibrium point, and in its simplest form, it is generally characterized by frequency, amplitude and phase. Frequency measurement of vibrating bodies helps in dynamic characterization of the system. Frequency measurement is also necessary in constituting passive control to identify and mitigate vibration related machine health hazards. The traditional systems and methods have provided for stroboscopic based machine vibration measurements but none of them have provided for detecting multi-frequency component of vibration and take much longer time in detecting multiple vibrations. Hence there is a need for simultaneous detection of vibrations for concurrent multiple frequencies (non-harmonic) and at multiple spatial points.

Figure 1:
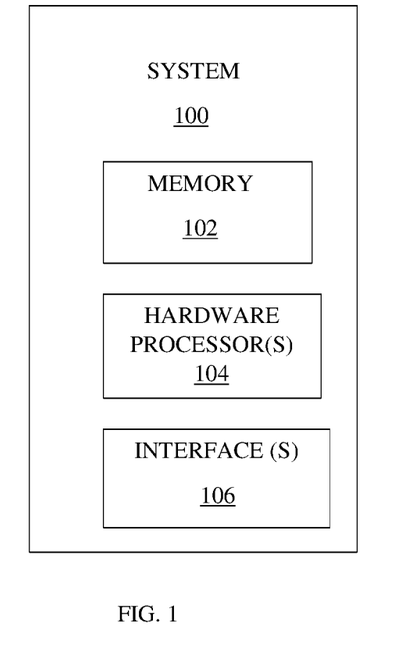
FIG. 1 illustrates a block diagram of a system for autonomous stroboscopic machine inspection for multi-point and multi-frequency vibration measurement according to an embodiment of the present disclosure.

FIG. 1 illustrates an exemplary block diagram of a system 100 for an autonomous stroboscopic machine inspection for multi-point and multi-frequency vibration measurement according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
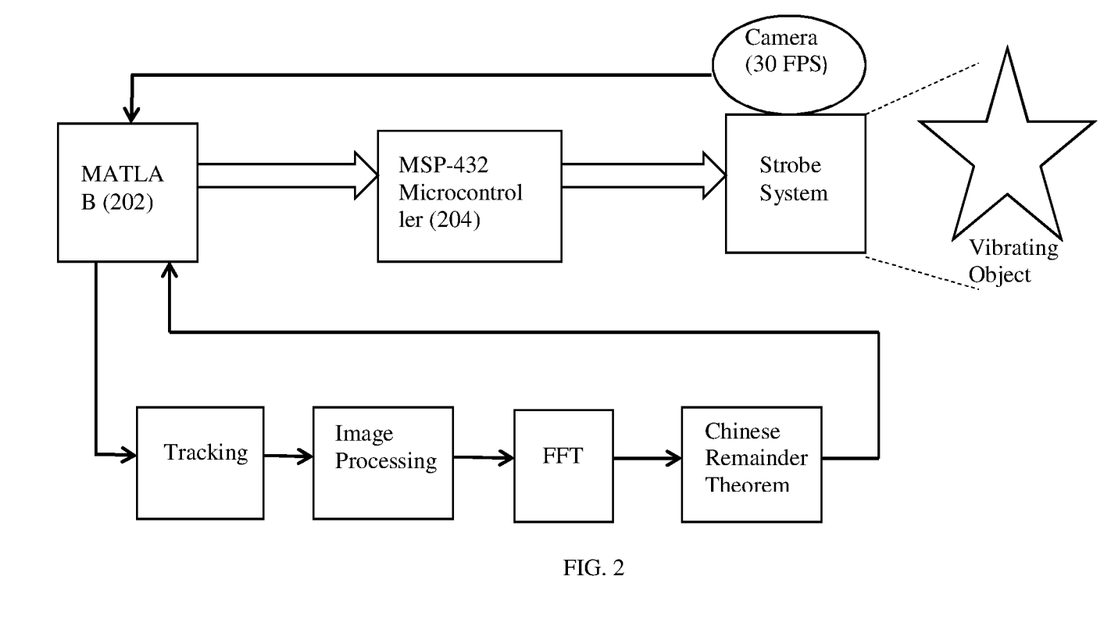
FIG. 2 is an architecture illustrating the components and process flow of a system for autonomous stroboscopic machine inspection for multi-point and multi-frequency vibration measurement according to an embodiment of the present disclosure.

According to an embodiment of the present disclosure, referring to FIG. 2, the architecture and components of the system an autonomous stroboscopic machine inspection for multi-point and multi-frequency vibration measurement may now be considered in detail. The strobe system architecture contains a number of Light Emitting Diodes or LEDs (not shown in the figure) which are controlled by the microcontroller board (MSP 432) 204. Based on the frequency input by the user, microcontroller board 204 produces one or more corresponding signals for controlling the strobe system. The micro-controller 204 comprises of a 32-bit ARM Cortex processor and 13-bit ADC may be used to accurately set the delay for the strobe system (not shown in the figure). A MATLAB 202 is a software environment. The whole algorithmic part of the present disclosure has been written in the software environment MATLAB 202 for example, serial port interfacing, image acquisition and processing etc. The algorithmic process has been written in the MATLAB 202 to detect multi-frequency machine vibration autonomously and unobtrusively. Further, the architecture comprises of a low frames per second (FPS) camera used to capture the vibration information in the form of the one or more images or frames. The MATLAB 202 is used for processing the captured video signal to obtain the RGB values of all pixels constituting one or more LED images in each video frame, and to calculate the sum of RGB values.

Figure 3A:
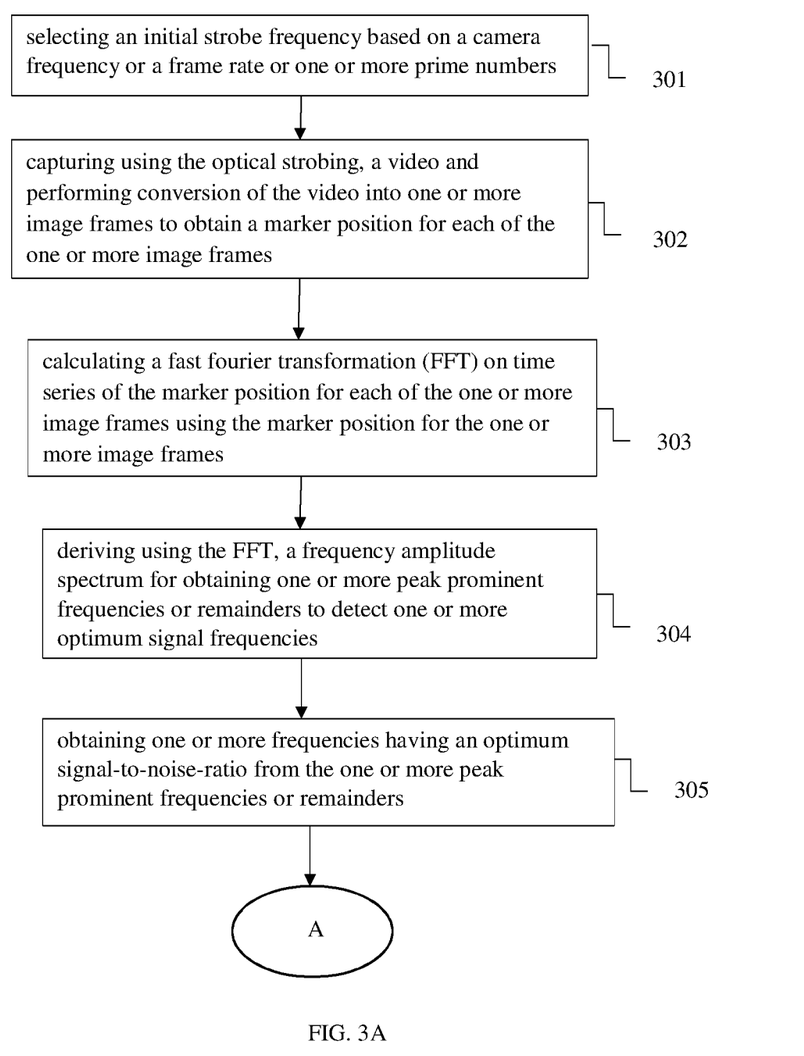
FIG. 3A is a flowchart illustrating the steps involved for autonomous stroboscopic machine inspection for multi-point and multi-frequency vibration measurement according to an embodiment of the present disclosure.
Figure 3B:
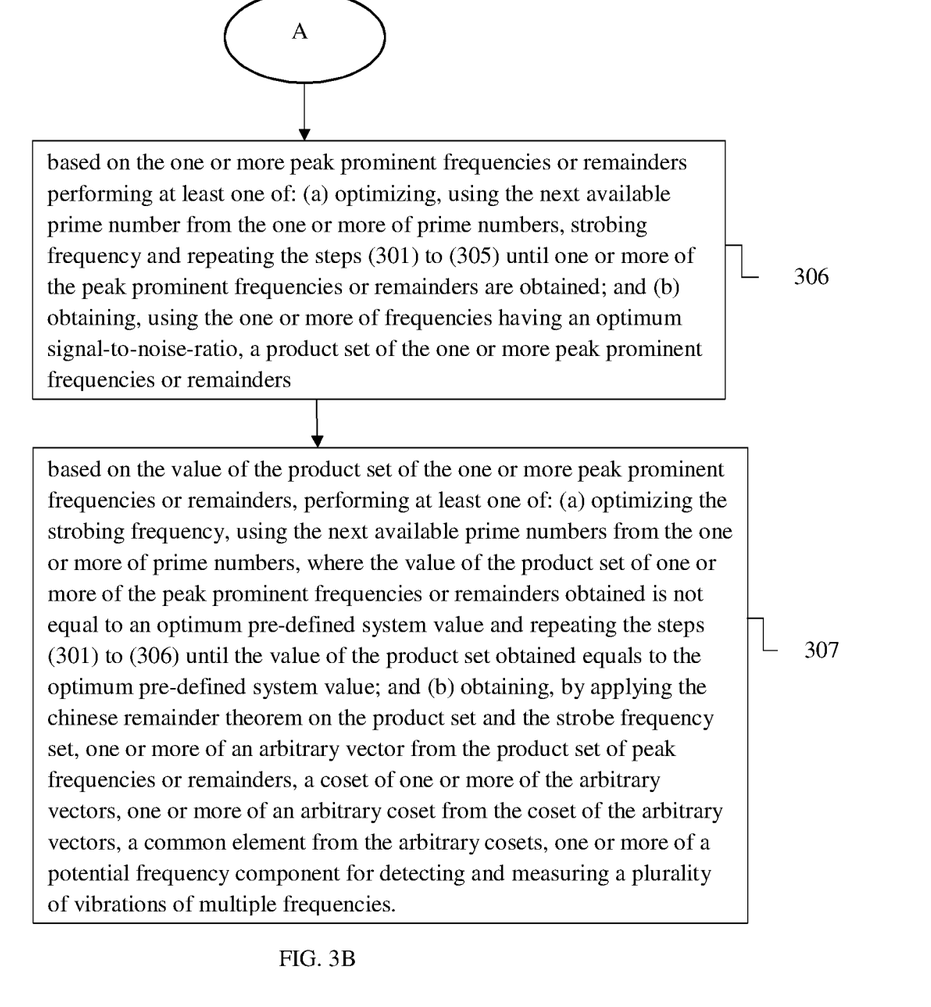
FIG. 3B is a continuation of FIG. 3A and is a flowchart illustrating the steps involved for autonomous stroboscopic machine inspection for multi-point and multi-frequency vibration measurement according to an embodiment of the present disclosure.

FIGS. 3A and 3B, with reference to FIG. 1, illustrates an exemplary flow diagram of a method for an autonomous stroboscopic machine inspection for multi-point and multi-frequency vibration measurement according to an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein. In an embodiment of the present disclosure, at step 301, the one or more hardware processors 104 perform selection of an initial strobe frequency based on a camera frequency or a frame rate or one or more prime numbers. According to an embodiment of the present disclosure, the optical strobing may be performed by selecting prime numbers for example 61 Hertz (Hz) depending upon a user's familiarity with the machine vibrating frequencies. According to an embodiment of the present disclosure, by selecting and giving a prime no 61 Hz to through the system 100 to a corresponding optical strobe system an initial strobe frequency value of 61 Hz may be obtained. Similarly if the prime number is 97 Hz the initial strobe frequency of 97 Hz may be obtained.

According to an embodiment of the present disclosure, at step 302, the one or more hardware processors 104 capture using the optical strobing, a video and the video is converted into one or more image frames to obtain a marker position for each of the one or more image frames using one or more image processing techniques. Using the one or more image processing techniques, one or more Red, Green, Blue (RGB) images may be converted to one or more gray images, wherein the one or more gray images may then be transformed to one or more image complements and finally a centroid of a white marker may be used to obtain the marker position for the one or more image frames. An example of the image processing technique to obtain the marker position for each of the one or more image frames may now be considered. A one second duration video may first be obtained using a camera having a frame rate of 30. The video to image conversion may then be performed which means converting a total of 30 images because the camera of 30 frames per second (FPS) has been used in the present disclosure. For each of these images or frames, a cropping of a marker location may then be manually performed. All these images may then be converted to the corresponding one or more gray images. All these images may then be complemented to obtain a white portion images or actual marker position. The marker position may be obtained finally for the one or more image frames.

Figure 4:
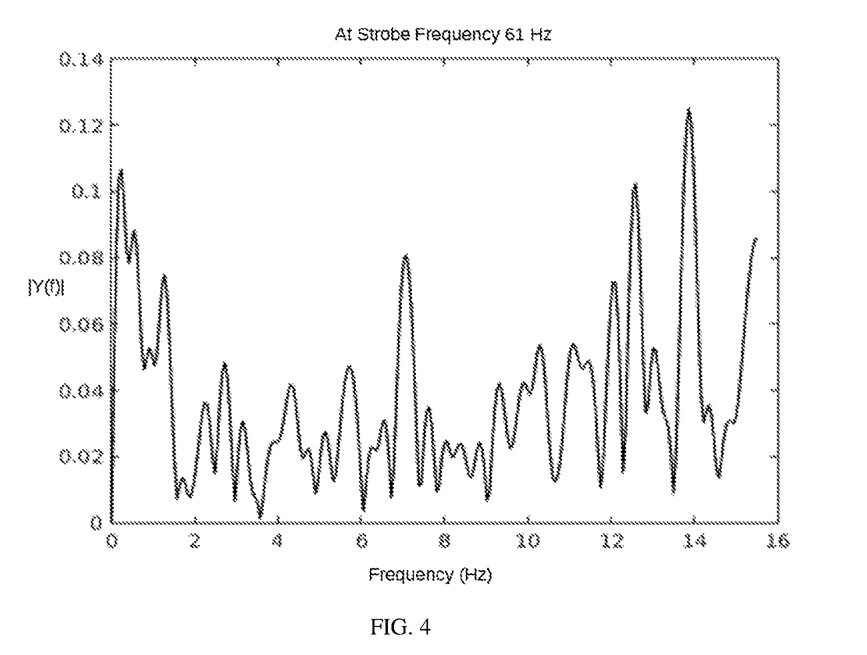
FIG. 4 shows the graphical representation of a peak signal captured when a fast fourier transformation (FFT) on a marker position of an image frame is calculated at 61 Hz according to an embodiment of the present disclosure.

According to an embodiment of the present disclosure, at step 303, the one or more hardware processors 104 perform calculation of a fast fourier transformation (FFT) on time series of the marker position for each of the one or more image frames using the marker position for the one or more image frames. Referring to FIG. 4 and table 1, the FFT at 61 Hz is 2.31 2.28 2.78 1.45 1.32. The corresponding FFT peak signal is 0 when FFT is obtained at 61 Hz. According to an embodiment of the present disclosure, peak signals may be referred to signals for which signal-to-noise ratio is high. Similarly, referring to Table 1 and FIGS. 5 through 11, the FFTs may be obtained at 67 Hz, 71 Hz, 73 Hz, 79 Hz, 83 Hz, 89 Hz and 97 Hz and the FFT value obtained using each frequency or random prime number along with the peak signals may be obtained. Table 1 depicts the FFTs and the total number of peak signals obtained at 67 Hz, 71 Hz, 73 Hz, 79 Hz, 83 Hz, 89 Hz and 97 Hz respectively.

TABLE 1

| FFT calculated at | Signal-to-noise ratio of the FFT peak | Peak signals |
| --- | --- | --- |
| 61 Hz | 2.31 2.28 2.78 1.45 1.32 | 0 |
| 67 Hz | 1.76 3.03 | 1 |

TABLE 1-continued

| FFT calculated at | Signal-to-noise ratio of the FFT peak | Peak signals |
| --- | --- | --- |
| 71 Hz | 2.81 2.78 2.83 | 0 |
| 73 Hz | 1.81 2.08 | 0 |
| 79 Hz | 1.1 1.4 3.87 2.1 2.23 | 1 |
| 83 Hz | 4.05 3.76 | 2 |
| 89 Hz | 4.11 3.97 | 2 |
| 97 Hz | 5.01 3.12 | 2 |

According to an embodiment of the present disclosure, at step 304, the one or more hardware processors 104 perform calculation to obtain one or more peak prominent frequencies or remainders to detect one or more optimum signal frequencies. At step 305, the one or more hardware processors 104 perform calculation to obtain one or more frequencies having an optimum signal-to-noise-ratio from the one or more peak prominent frequencies or remainders. The peak prominent frequencies or remainders having optimum signal frequencies may be obtained by comparing the one or more peak prominent frequencies or remainders with a pre-defined optimum value according to an embodiment of the present disclosure. Referring to FIG. 4 through 11 and Table 2, the peak prominent frequencies or remainders and the frequencies having optimum signal-to-noise ratio obtained using the peak prominent frequencies or remainders may be depicted. According to an embodiment of the present disclosure, the optimum signal-to-noise ratio may be taken as greater than 3 decibel (dB).

TABLE 2

| FFT calculated at | Peak prominent frequencies or remainders | Optimum signal-to-noise ratio (>3 dB) |
| --- | --- | --- |
| 61 Hz | 2.31 2.28 2.78 1.45 1.32 | No |
| 67 Hz | 1.76 3.03 | Yes - 3.03 |
| 71 Hz | 2.81 2.78 2.83 | No |
| 73 Hz | 1.81 2.08 | No |
| 79 Hz | 1.1 1.4 3.87 2.1 2.23 | Yes - 3.87 |
| 83 Hz | 4.05 3.76 | Yes 4.05 3.76 |
| 89 Hz | 4.11 3.97 | Yes 4.11 3.97 |
| 97 Hz | 5.01 3.12 | Yes 5.01 3.12 |

According to an embodiment of the present disclosure, at step 306, based on the one or more peak prominent frequency or remainder values obtained above, the one or more hardware processors 104 may perform optimization using the next available prime number from the one or more of prime numbers, of strobing frequency and may further repeat the steps (301) to (305) until one or more of the peak prominent frequencies or remainders having an optimum signal-to-noise ratio are obtained. According to an embodiment of the present disclosure, referring to table 2 again, since the peak prominent frequencies or remainders having an optimum signal-to-noise ratio of >3 dB could not be obtained at 61 Hz, 71 Hz and 73 Hz, the above steps (301) to (305) may be repeated until the peak prominent frequencies or remainders having an optimum signal-to-noise ratio may be obtained.

Figure 5:
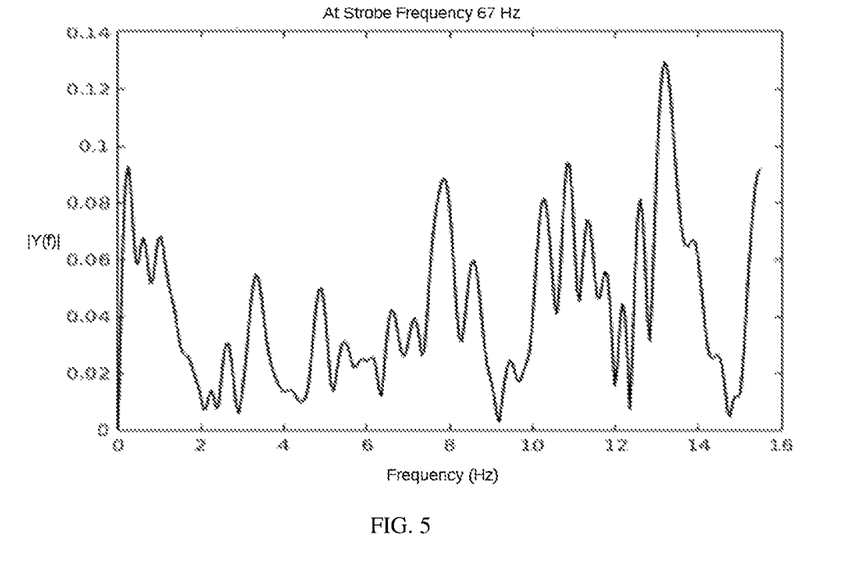
FIG. 5 shows the graphical representation of the peak signals captured when the fast fourier transformation (FFT) on the marker position of the image frames is calculated at 67 Hz according to an embodiment of the present disclosure.
Figure 6:
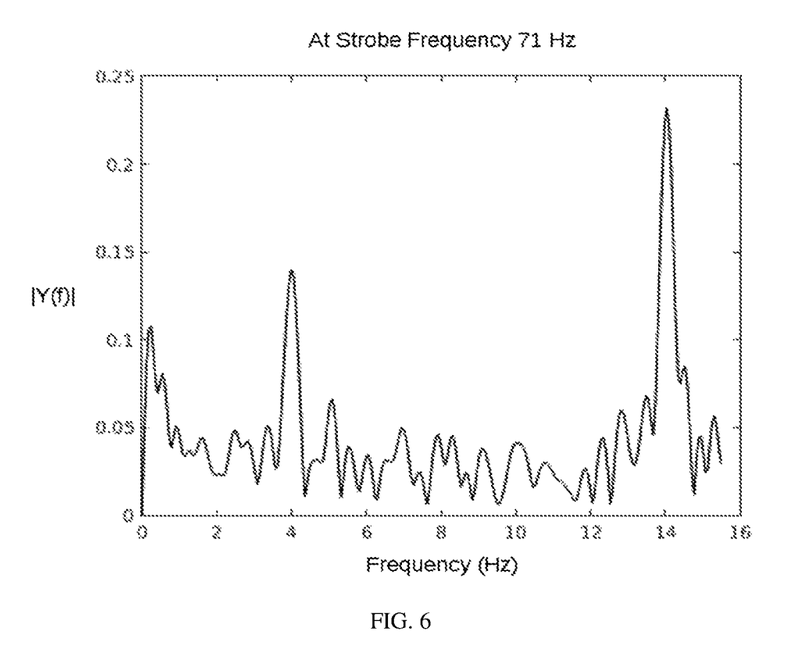
FIG. 6 shows the graphical representation of the peak signals captured when the fast fourier transformation (FFT) on the marker position of the image frames is calculated at 71 Hz according to an embodiment of the present disclosure.
Figure 7:
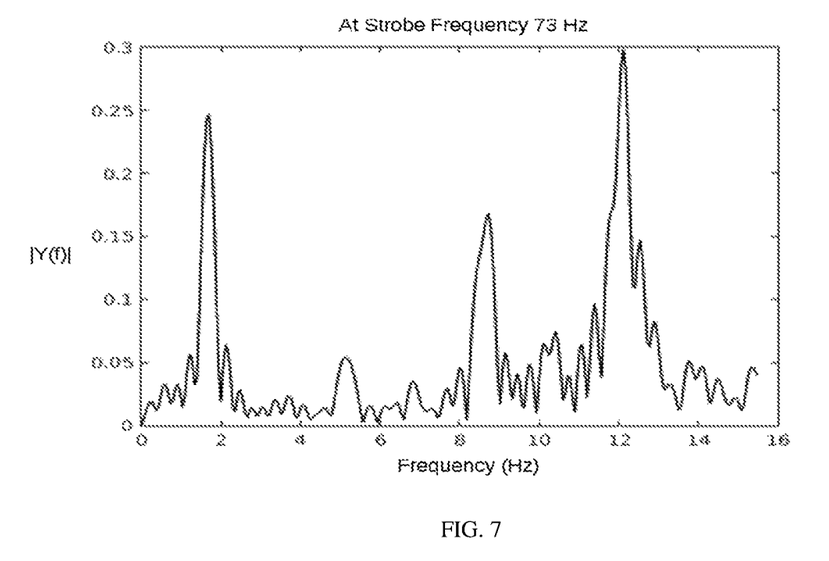
FIG. 7 shows the graphical representation of the peak signals captured when the fast fourier transformation (FFT) on the marker position of the image frames is calculated at 73 Hz according to an embodiment of the present disclosure.
Figure 8:
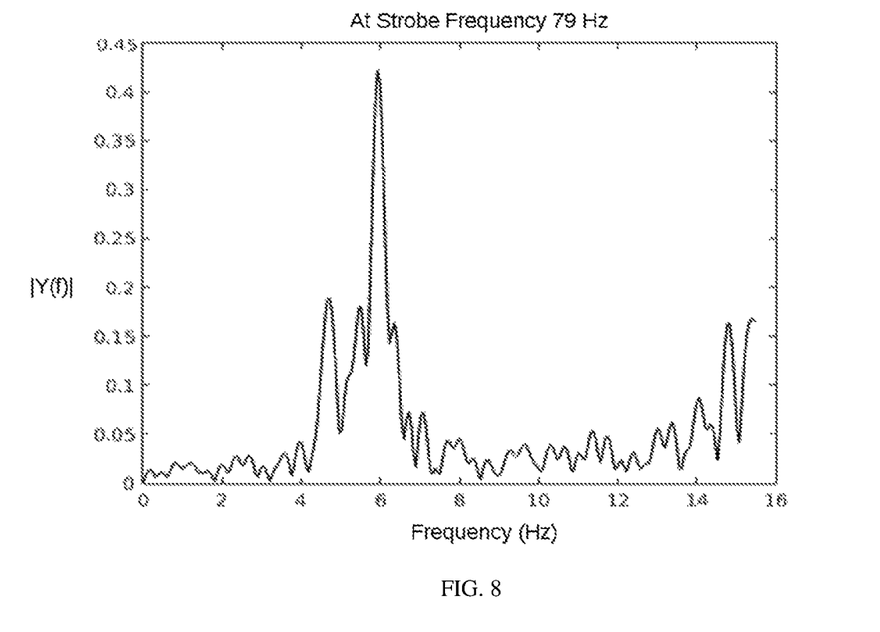
Figure 9:
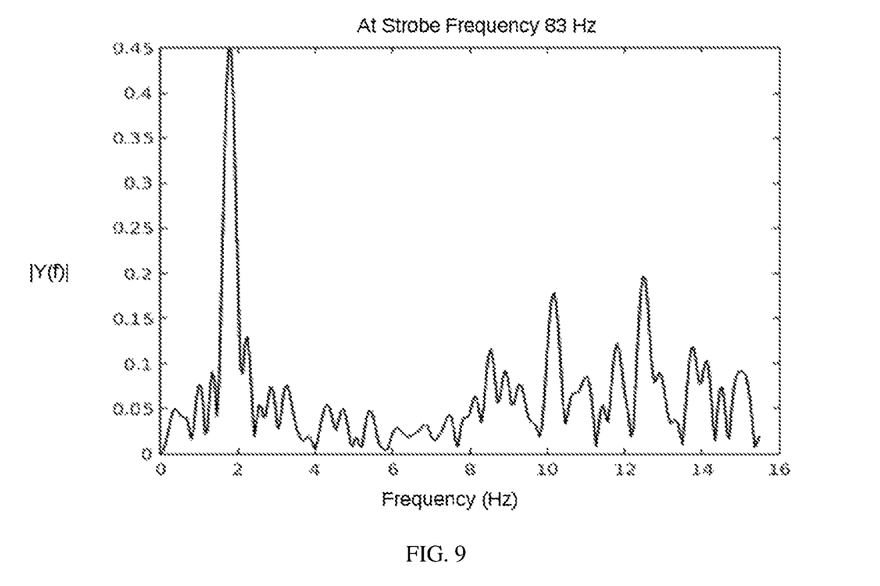
FIG. 9 shows the graphical representation of the peak signals captured when the fast fourier transformation (FFT) on the marker position of the image frames is calculated at 83 Hz according to an embodiment of the present disclosure.
Figure 10:
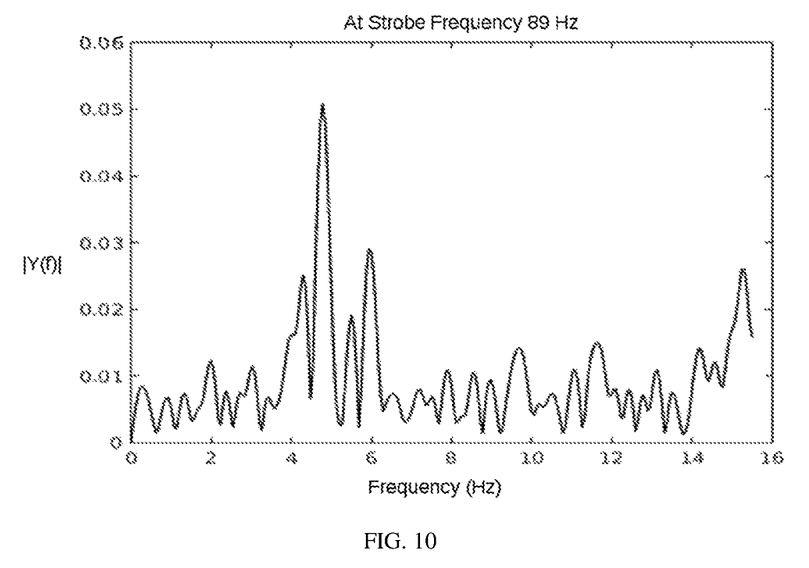
FIG. 10 shows the graphical representation of the peak signals captured when the fast fourier transformation (FFT) on the marker position of the image frames is calculated at 89 Hz according to an embodiment of the present disclosure.
Figure 11:
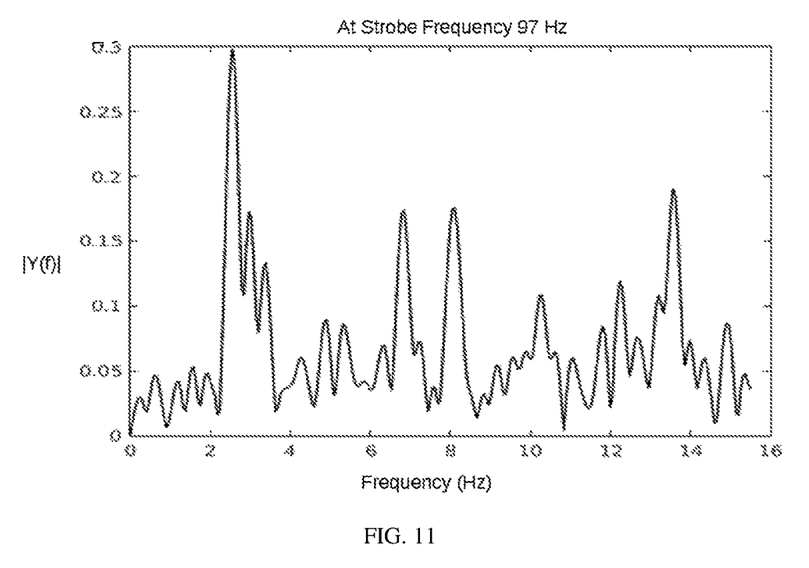
FIG. 11 shows the graphical representation of the peak signals captured when the fast fourier transformation (FFT) on the marker position of the image frames is calculated at 97 Hz according to an embodiment of the present disclosure.

According to an embodiment of the present disclosure, at step 306, the one or more hardware processors 104 may further perform obtaining a product set or a remainder set of the one or more peak prominent frequencies or remainders of the one or more of frequencies having an optimum signal-to-noise-ratio obtained based upon the one or more of frequencies having an optimum signal-to-noise-ratio. A product set may be defined as the peak frequency value corresponding to the strobe value. Referring to table 2 again and the FIG. 5, since the optimum signal-to-noise ratio of greater than 3 dB (decibels) has been obtained at 67 Hz, the product set or the remainder set may be obtained as:

strobe frequency set (obtained using the next available prime number)=[67]; remainder set (S)= [13.98]

Referring to Table 3 below, the remainder sets or the product sets of the one or more peak prominent frequencies or remainders having an optimum signal-to-noise ratio may be depicted.

TABLE 3

| FFT calculated at | Strobe frequency set (next available prime number) | Product set or the remainder set |
|---|---|---|
| 67 Hz | 67 | 13.98 |
| 79 Hz | 67, 79 | 13.98; 6.05 |
| 83 Hz | 67, 79, 83 | 13.98; 6.05; 1.64 11.87 |
| 89 Hz | 67, 79, 83, 89 | 13.98; 6.05; 1.64 11.87; 4.6 5.8 |
| 97 Hz | 67, 79, 83, 89, 97 | 13.98; 6.05; 1.64 11.87; 4.6 5.8; 2.5 8.3 |

According to an embodiment of the present disclosure, at step 307, based on the value of the product set of the one or more peak prominent frequencies or remainders obtained, the one or more hardware processors 104 may perform optimization of the strobing frequency, using the next available prime numbers from the one or more of prime numbers, where the value of the product set of one or more of the peak prominent frequencies or remainders obtained is not equal to an optimum pre-defined system value and may further repeat the steps (301) to (306) until the value of the product set obtained equals to the optimum pre-defined system value. According to an embodiment of the present disclosure, the optimum pre-defined system value may be taken as 5 as for the chinese remainder theorem to converge to a specific solution for capturing multi-frequency vibrations, a minimum of 5 sets is required. According to an embodiment of the present disclosure, if more than 5 sets are selected, for example $6^{th}$ or $7^{th}$ sets obtained using the one or more further prime numbers like 101 Hz or 103 Hz, it may lead to more time to capture multi-frequency vibrations. Hence, optimum pre-defined system value may be taken as 5. Referring to table 3 above again, since the product set or the remainder set obtained is not equal to optimum pre-defined system value, which is 5, the strobing frequency may be optimized using the next available prime numbers from the one or more of prime numbers. Referring to table 3 again, hence at 67 Hz, the product set or the remainder set is 13.98, which is not equal to 5, the optimum pre-defined system value. Hence the strobing frequency may be optimized to 79 Hz. Since the product set or the remainder set obtained at 79 Hz, 83 Hz, 89 Hz are not equal to 5, the strobing frequency may be optimized to 97 Hz. At 97 Hz, the product set or the remainder set of the peak prominent frequencies or remainders is close to or equal to 5 and hence no further optimization may be required.

Figure 12:
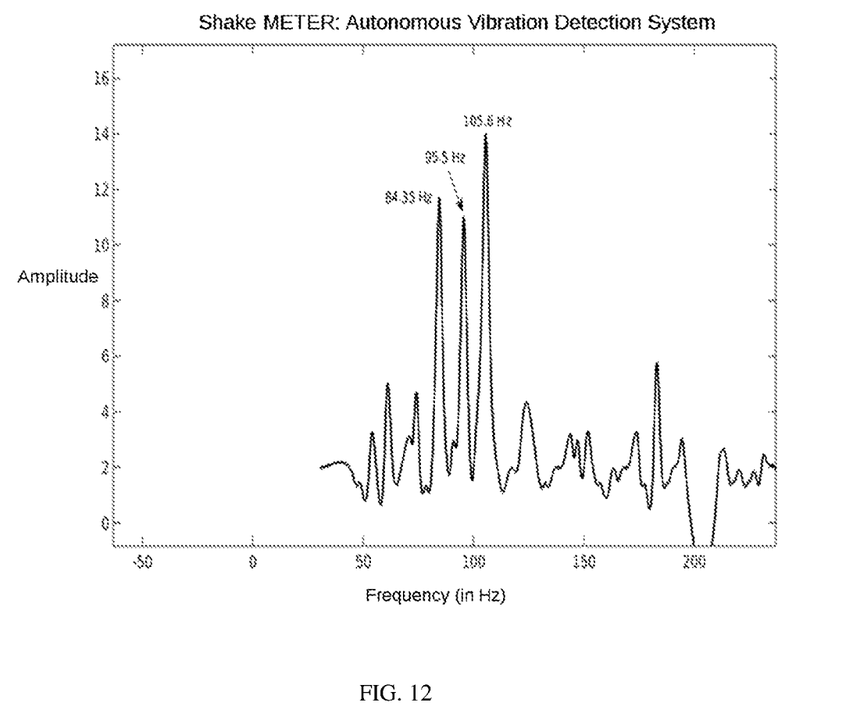
FIG. 12 shows the graphical representation of the final system output obtained after capturing multi-frequency vibrations according to an embodiment of the present disclosure.

According to an embodiment of the present disclosure, at step 307, the one or more hardware processors 104 obtain, by applying the chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies. According to an embodiment of the present disclosure, referring to Table 3 and FIG. 12, the chinese remainder theorem may now be applied to the product set or the remainder set values to detect multiple vibrations. How the Chinese remainder theorem may be used to obtain a solution by converging to the frequency values, may now be explained in detail. Firstly, the strobe frequency values (the FFT calculated referring to table 3) into a variable strobe frequency set (STR) may be stored. Hence the strobe frequency set (STR)=[67,79,83,89,97]. Similarly, the corresponding remainder set of the product set may be stored. Further, for i=1:length(S), (length of S=8) where i is a counter and S denotes the remainder set.

a. From S, select $i^{th}$ value and store it into a variable $k_i$, (when i=1, $k_i$=13.98), where i is a counter and k is the arbitrary vector.

b. For j=1:length(STR) (length of STR=5), a may be defined as coset $w_i=\{k_i+n*STR_j\}$ where n is any integers staring from 1.

$$(w_1=\{13.98+1*67\},\{13.98+2*67\},\{13.98+3*67\},\\\{13.98+4*67\},\{13.98+5*67\},\\\{13.98+1*79\},\ldots,\{13.98+5*79\},\ldots\\,\{13.98+5*97\}),$$

where j, k and $w_i$ denote the counter, the arbitrary vector and the w . . . $w_i$ denoted the final output.

c. Repeating above steps until the value if i≠8 and therefore it will be matrix of w=[$w_1$ $w_2$ . . . $w_s$])

d. Finally, the common element from the above coset w may now be obtained. Referring to FIG. 12, the common elements of 'w' are 84.35 Hz, 95.5 Hz, 105.6 Hz. These values depict the actual multi-frequency vibrations detected according to an embodiment of the present disclosure.

Referring to FIG. 12 below, the common elements have numerous repetition in "w", that's why this values produce the peaks in the plot and which depicts the detected machine vibrational frequencies. It may be noted that actual vibration frequencies were 85 Hz, 95 Hz and 105 Hz. The actual vibration frequencies may be referred to pre-defined frequencies of vibration of a system or any vibrating object. These may be referred to the frequency values which were intended to be achieved for measuring and comparing the detection and measurement of a multi-frequency vibration component. Hence, the actual and the detected multi-frequency vibrations almost match with each other which provides for the optical strobing based multi-frequency vibration measurement according to the embodiments of the present disclosure.

According to an embodiment of the present disclosure, an example of how the of the chinese remainder theorem may be used to obtain a plurality of vibrations of multiple frequencies may now be considered. According to an embodiment of the present disclosure, the identities may be assumed to be X=0(mod 3), X=3(mod 4) and X=4(mod 5). The one or more hardware processors 104 may calculate the value of X using the chinese remainder theorem by first considering the highest modulus i.e. 5. Further, the possible combination based on last modulo operation: 4(mod 5) may now be considered as:

| 5 * 0 + 4 = 4 | 5 * 1 + 4 = 9 | 5 * 2 + 4 = 14 | 5 * 3 + 4 = 19 |

Still further, the previous modulo operation 3(mod 4) may now be considered and a divisor which may leave a remainder of 3 may be obtained as:

| 4 | 9 | 14 | 19 |
| | Mod 4 | | |
| Remainder = 0 | 1 | 2 | 3 |

So 19 is the answer.

The third and final modulo condition may be considered. X=0(mod 3)

Here, 19 may be divided by 3 and it leaves a remainder of 1, hence 19 may not be the actual solution.

| 19 | 19 + 5 * 4 = 39 | 19 + 2 * 5 * 4 = 59 |
| | Mod 3 | |
| Remainder = 1 | 0 | 2 |

So the value of X may be considered as 39.

According to an embodiment of the present disclosure, a comparison time and accuracy taken by the traditional systems and methods and the present invention may now be considered. Referring to table 4, the average time taken by the traditional systems and methods to detect single and multi-frequency vibrations is 5 minutes and 10 minutes respectively while accuracy is between 96-99% and 90-95% respectively. However, using the present disclosure the single and multi-frequency detection can be done in 0.25 minutes and 0.42 minutes respectively with 100% accuracy in both cases.

TABLE 4

| | Traditional Method | | Present disclosure (proposed methodology) | |
|---|---|---|---|---|
| | Single Frequency Detection | Multi-Frequency Detection | Single Frequency Detection | Multi-Frequency Detection |
| Accuracy (%) | 96-99 | 90-95 | 100 | 100 |
| Execution Time (min) | 5 | 10 | 0.25 | 0.42 |

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for an optical strobing based multi-frequency vibration measurement, the method comprising a processor implemented steps of:
   (i) selecting, based on a camera frequency or a frame rate or one or more prime numbers, an initial strobe frequency (301);
   (ii) capturing, using the optical strobing, a video and performing conversion of the video into one or more image frames to obtain a marker position for each of the one or more image frames (302);
   (iii) calculating, using the marker position for the one or more image frames, a fast Fourier transformation (FFT) on time series of the marker position for each of the one or more image frames (303);
   (iv) deriving, using the FFT, a frequency amplitude spectrum for obtaining one or more peak prominent frequencies or remainders to detect one or more optimum signal frequencies (304);
   (v) obtaining, from the one or more peak prominent frequencies or remainders, one or more frequencies having an optimum signal-to-noise-ratio (305);
   (vi) based on the one or more peak prominent frequencies or remainders performing at least one of (306):
      (a) optimizing, using the next available prime number from the one or more of prime numbers, strobing frequency and repeating steps (i) to (v) until one or more of the peak prominent frequencies or remainders are obtained; and
      (b) obtaining, using the one or more of frequencies having an optimum signal-to-noise-ratio, a product set of the one or more peak prominent frequencies or remainders; and
   (vii) based on the value of the product set of the one or more peak prominent frequencies or remainders, performing at least one of (307):
      (a) optimizing the strobing frequency, using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (b) obtaining, by applying the Chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies.

2. The method of claim 1, wherein the step of detecting and measuring the plurality of vibrations of multiple frequencies comprises eliminating one or more potential frequency components from the product set of one or more of the peak prominent frequencies or remainders for determining and measuring further corresponding vibrating frequencies.

3. A system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
(i) select based on a camera frequency or a frame rate or one or more prime numbers, an initial strobe frequency;
(ii) capture using the optical strobing, a video and performing conversion of the video into one or more image frames to obtain a marker position for each of the one or more image frames;
(iii) calculate using the marker position for the one or more image frames, a fast Fourier transformation (FFT) on time series of the marker position for each of the one or more image frames;
(iv) derive using the FFT, a frequency amplitude spectrum for obtaining one or more peak prominent frequencies or remainders to detect one or more optimum signal frequencies;
(v) obtain from the one or more peak prominent frequencies or remainders, one or more frequencies having an optimum signal-to-noise-ratio;
(vi) based on the one or more peak prominent frequencies or remainders perform at least one of:
(a) optimize using the next available prime number from the one or more of prime numbers, strobing frequency and repeating steps (i) to (v) until one or more of the peak prominent frequencies or remainders are obtained; and
(b) obtain using the one or more of frequencies having an optimum signal-to-noise-ratio, a product set of the one or more peak prominent frequencies or remainders; and
(vii) based on the value of the product set of the one or more peak prominent frequencies or remainders, perform at least one of:
(a) optimize the strobing frequency using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (b) obtain by applying the chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies.

4. The system (100) of claim 3, wherein the step of detecting and measuring the plurality of vibrations of multiple frequencies comprises eliminating one or more potential frequency components from the product set of one or more of the peak prominent frequencies or remainders for determining and measuring further corresponding vibrating frequencies.

5. One or more non-transitory machine readable information storage mediums comprising one or more instructions which when executed by one or more hardware processors causes the one or more hardware processor to perform a method for an optical strobing based multi-frequency vibration measurement, said method comprising:
(i) selecting, based on a camera frequency or a frame rate or one or more prime numbers, an initial strobe frequency;
(ii) capturing, using the optical strobing, a video and performing conversion of the video into one or more image frames to obtain a marker position for each of the one or more image frames;
(iii) calculating, using the marker position for the one or more image frames, a fast Fourier transformation (FFT) on time series of the marker position for each of the one or more image frames;
(iv) deriving, using the FFT, a frequency amplitude spectrum for obtaining one or more peak prominent frequencies or remainders to detect one or more optimum signal frequencies;
(v) obtaining, from the one or more peak prominent frequencies or remainders, one or more frequencies having an optimum signal-to-noise-ratio; and
(vi) based on the one or more peak prominent frequencies or remainders performing at least one of:
(a) optimizing, using the next available prime number from the one or more of prime numbers, strobing frequency and repeating steps (i) to (v) until one or more of the peak prominent frequencies or remainders are obtained; and
(b) obtaining, using the one or more of frequencies having an optimum signal-to-noise-ratio, a product set of the one or more peak prominent frequencies or remainders;
(vii) based on the value of the product set of the one or more peak prominent frequencies or remainders, performing at least one of:
(a) optimizing the strobing frequency, using the next available prime numbers from the one or more of prime numbers, where the value of the product set of one or more of the peak prominent frequencies or remainders obtained is not equal to an optimum pre-defined system value and repeating one or more of the above steps until the value of the product set obtained equals to the optimum pre-defined system value; and (b) obtaining, by applying the Chinese remainder theorem on the product set and the strobe frequency set, one or more of an arbitrary vector from the product set of peak frequencies or remainders, a coset of one or more of the arbitrary vectors, one or more of an arbitrary coset from the coset of the arbitrary vectors, a common element from the arbitrary cosets, one or more of a potential frequency component for detecting and measuring a plurality of vibrations of multiple frequencies.

6. The one or more non-transitory machine readable information storage mediums of claim 5, wherein the step of detecting and measuring the plurality of vibrations of multiple frequencies comprises eliminating one or more potential frequency components from the product set of one or more of the peak prominent frequencies or remainders for determining and measuring further corresponding vibrating frequencies.

\* \* \* \* \*